(12) United States Patent
Park et al.

(10) Patent No.: US 11,817,798 B2
(45) Date of Patent: Nov. 14, 2023

(54) FRICTIONAL ELECTRICITY GENERATOR INCREASING OUTPUT TRANSFER EFFICIENCY

(71) Applicant: KOREA ELECTRONICS TECHNOLOGY INSTITUTE, Seongnam-si (KR)

(72) Inventors: Hyun Moon Park, Gunpo-si (KR); Byung Soo Kim, Yongin-si (KR); Tae Ho Hwang, Yongin-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 88 days.

(21) Appl. No.: 17/456,833

(22) Filed: Nov. 29, 2021

(65) Prior Publication Data

US 2022/0085736 A1    Mar. 17, 2022

Related U.S. Application Data

(63) Continuation of application No. PCT/KR2019/006491, filed on May 30, 2019.

(30) Foreign Application Priority Data

May 29, 2019   (KR) .......................... 10-2019-0063383

(51) Int. Cl.
    *H02N 1/04*   (2006.01)
(52) U.S. Cl.
    CPC ..................... *H02N 1/04* (2013.01)
(58) Field of Classification Search
    CPC ....................................... H02N 1/04

USPC .......................................................... 310/310
    See application file for complete search history.

(56) References Cited

U.S. PATENT DOCUMENTS

| | | | |
|---|---|---|---|
| 2015/0311823 A1* | 10/2015 | Wang | H02N 1/04 310/300 |
| 2018/0013358 A1 | 1/2018 | Turng et al. | |
| 2019/0006961 A1 | 1/2019 | Wu et al. | |
| 2019/0131889 A1* | 5/2019 | Oliveira Ventura | F03B 13/00 |
| 2020/0395870 A1 | 12/2020 | Byun et al. | |

FOREIGN PATENT DOCUMENTS

| | | |
|---|---|---|
| KR | 10-2016-0125710 A | 11/2016 |
| KR | 10-2017-0126757 A | 11/2017 |

OTHER PUBLICATIONS

International Search Report dated Feb. 25, 2020 in International Application No. PCT/KR2019/006491.

* cited by examiner

*Primary Examiner* — Ahmed Elnakib
(74) *Attorney, Agent, or Firm* — Knobbe, Martens, Olson & Bear, LLP

(57) ABSTRACT

This application relates to a frictional electricity generator increasing output transfer efficiency. In one aspect, the frictional electricity generator includes a housing and a power generation element which is arranged in the housing and in which a + position pole and a − position pole are arranged according to the movement of a positive charge and a negative charge by friction. The + position pole and the − position pole of the power generation element may be arranged at a distance of a predetermined angle on a plane so as to minimize energy loss due to mutual repulsion, and may be connected to each transmission path.

6 Claims, 7 Drawing Sheets

FRICTIONAL ELECTRICITY GENERATOR INCREASING OUTPUT TRANSFER EFFICIENCY

CROSS REFERENCE TO RELATED APPLICATIONS

This is a continuation application of International Patent Application No. PCT/KR2019/006491, filed on May 30, 2019, which claims priority to Korean Patent Application No. 10-2019-0063383 filed on May 29, 2019, contents of both of which are incorporated herein by reference in their entireties.

BACKGROUND

Technical Field

The present disclosure relates to a frictional electricity generator with increased output transmission efficiency.

Description of Related Technology

Generally, in an energy harvesting power generation platform, although the shapes of friction vibration-type nanogenerators are different, a way to develop a multi-layered vertical structure is proposed. However, a movement speed of electrons due to a potential difference can become relatively slower than a vibration speed of the electrons, transmission of the generated energy is delayed, resulting in loss of the entire generated power. Also, transmission efficiency can be reduced due to a narrow transmission path as compared to an amount of power generation.

SUMMARY

The present disclosure is directed to providing a frictional electricity generator capable of increasing output transmission efficiency of generated power by optimizing the positions and number of electrodes of a power generation element of a frictional electricity generator to which vertical multi-layered nano elements are applied.

One aspect of the present disclosure provides a frictional electricity generator with increased output transmission efficiency, which includes a housing, and a power generation element which is disposed in the housing and in which a + position pole and a − position pole are disposed according to movement of a positive charge and a negative charge by friction, wherein the + position pole and the − position pole of the power generation element are disposed a preset angle apart from each other in a plan view to minimize energy loss due to a mutual repulsive force and are each connected to one transmission path.

When the + position pole and the − position pole are provided as a pair, the + position pole and the − position pole may be disposed 180 degrees apart from each other.

When a diameter of the power generation element and the sum of generated energy satisfy preset conditions, the + position pole and the − position pole may be disposed by increasing the number thereof. The preset conditions are as follows according to [Equation 1], and a diameter 1 of the power generation element may be greater than or equal to a preset length (5 cm), and the sum of the generated energy may be greater than or equal to a preset multiple (2 times) of generated energy by a single-layer power generation element, $$Te\sum_{i=1}^{n} t_i(e_i) > 2 \times t_1(e_1)(l \geq 50 \text{ mm}) \quad \text{[Equation 1]}$$

(Te: total energy of power generation platform, t: power generation element, e: generated energy, and l: diameter of power generation element).

Closest different position poles, among a plurality of + position poles and a plurality of − position poles, may be spaced 90 degrees or more from each other.

When a diameter 1 of the power generation element is greater than or equal to a preset length (3 cm), the transmission paths may be provided in proportion to the number of layers of the power generation element and may be connected to a preset number of + position poles and − position poles of the power generation element according to [Equation 2], $$p(l_j) = \frac{n}{2} \quad \text{[Equation 2]}$$

(p: number of layers of power generation element connected to one transmission path, l: diameter of power generation element, and n: number of layers of power generation element).

According to the present disclosure, by optimizing the positions and number of + poles and − poles according to an amount of power generation of vertical multi-layered nano power generation elements, it is possible to improve an amount of power generation of triboelectric nanogenerators (TENGs) in a vertical series of two or more layers.

According to the present disclosure, by optimizing the positions of electrodes according to an area, the number of layers, and an amount of power generation of the vertical multi-layered nano power generation elements, it is possible to convert a maximum amount of power generation of the power generation element and smoothly transmit the power to a source device.

According to the present disclosure, it is possible to improve the power generation output of a friction-based power generator of a vertical series of four or more layers by 30% or more as compared to a typical friction-based power generator.

Effects of the present disclosure are not limited to the above-described effects and other effects that are not described may be clearly understood by those skilled in the art from the following descriptions.

DETAILED DESCRIPTION

Figure 1:
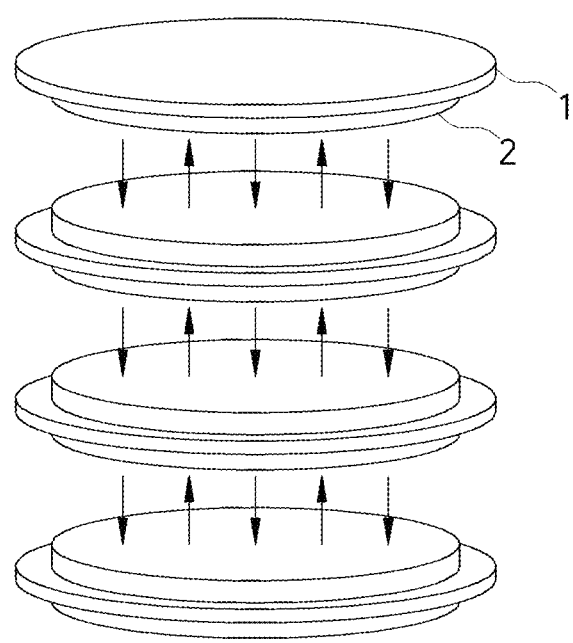
FIGS. 1 and 2 illustrate a power generator using vertical multi-layered nano power generation elements and + and − position poles.

The above-described objects, other objects, advantages, and features of the present disclosure and methods of achieving the same will be clearly understood with reference to the accompanying drawings and the following detailed embodiments.

However, the present disclosure is not limited to the embodiments to be disclosed below and may be implemented in various different forms. The following embodiments are merely provided to easily inform those skilled in the art of the objects, configuration, and effects of the present disclosure. The scope of the present disclosure is defined by the appended claims.

Meanwhile, the terms used herein are provided only to describe the embodiments of the present disclosure and not for purposes of limitation. In this specification, the singular forms include the plural forms unless the context clearly indicates otherwise. It will be understood that the terms "comprise" and/or "comprising," when used herein, specify some stated components, steps, operations and/or elements but do not preclude the presence or addition of one or more other components, steps, operations and/or elements.

Hereinafter, in order to aid understanding of those skilled in the art, a background in which the present disclosure is proposed will be described first and embodiments of the present disclosure will be described.

A nano power generation technique for producing electricity by collecting motion energy has been proposed, and in technology named triboelectric nanogenerators (TENGs), vibration, friction, and wavelength energy caused by body movement are changed to usable energy.

A power generation element of an implant and energy harvesting power generation platform includes positive (+) charges and negative (−) charges, and exchange occurs in two layers due to collision between the charges which is caused by a frictional current so that generated energy is generated.

When the power generation elements are vertically disposed in multiple layers, more generated energy is generated than when being arranged in one layer. An amount of generated energy is not increased in direct proportion, such as an increase of 1.8 times when arranged in two layers, an increase of 2.4 times when arranged in three layers, and an increase of 3 times when arranged in four layers. When arranged in eight layers, the output is approximately 6 times in equal proportion, and thus an increase in power generation is greatly reduced.

There are two causes that cause such a phenomenon. The first cause is that a vibration speed of electrons, which is energy generated by high frequency waves and friction in each layer, reaches the speed of light, whereas a movement speed of the electrons due to a potential difference of electrons is relatively lower than the vibration speed.

Although there is an advantage in that energy is continuously generated according to the impact and movement of these charges, transmission of the generated energy is relatively delayed, which leads to a loss of the entire generated power.

The second cause relates to a transmission path and is that energy generated per unit area is greatly increased as compared to that in the past due to the development of friction materials so that the transmission path through which the energy is transmitted is narrowed.

Referring to related papers from the last one or two years, nano power generation elements are configured in one layer or in the form of a multi-layered plate attached to one layer, and generated energy has a voltage of 200 to 400 V and a current of several tens of nA that can be transmitted to + and − pole transmission paths through strands such that an amount of power generation is small.

However, the voltage is not changed significantly, whereas the current is increased to around 10 μA, and thus the efficiency of transmission through the + and − pole transmission paths is lowered.

According to the above platform, there is a problem in that the nano power generation elements are connected by being grounded through the + and − pole transmission paths based on a reference potential (0 V), which affects a transmission speed of charges because a potential transmission range is narrow, resulting in the loss of output transmission due to the low level connection as compared to the amount of power generation.

Figure 2:
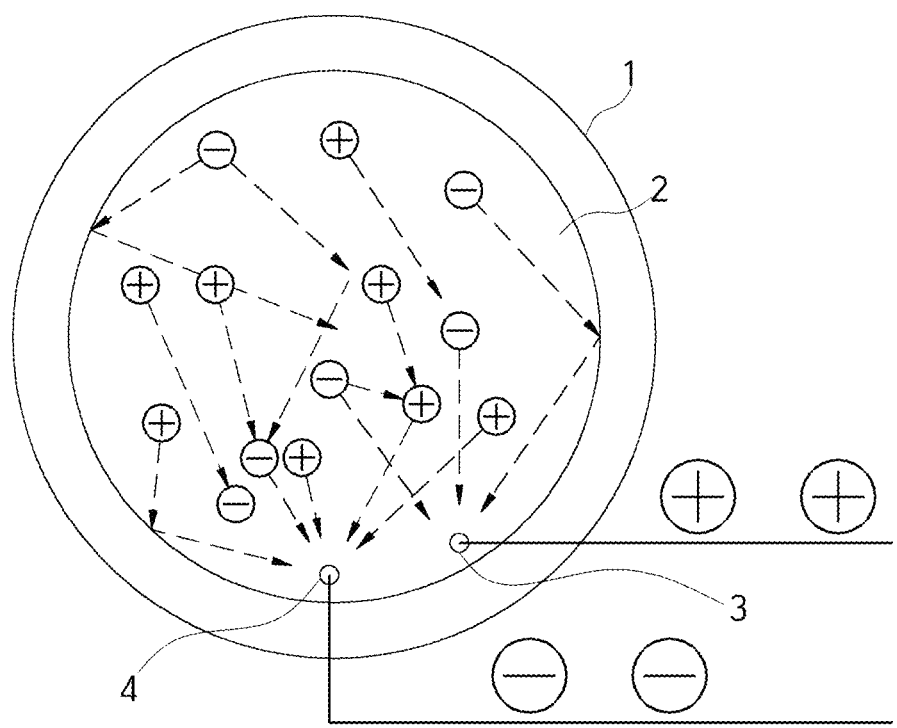

FIGS. 1 and 2 illustrate a power generator using vertical multi-layered nano power generation elements and + and − position poles 3 and 4.

Referring to FIGS. 1 and 2, the power generator using the vertical multi-layered nano power generation elements includes a housing 1 and a power generation element 2 on which an oxide film is formed. As two plates collide, a plurality of positive charges and a plurality of negative charges move due to friction. In this case, the positive charges and the negative charges move in specific directions.

A region with a number of negative charges pushes the positive charges and is changed to a − potential, and a region with a number of positive charges pushes the negative charges and is changed to a + potential.

In such changes, when the + potential and the − potential are close to each other, the + potential and the − potential push each other due to a repulsive force, resulting in a loss of generated energy.

Figure 3:
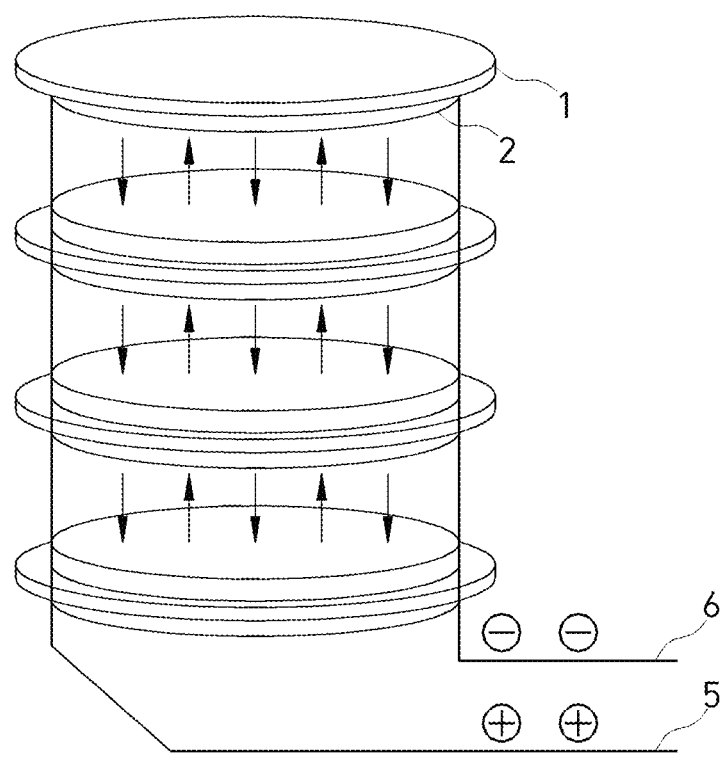
FIG. 3 illustrates wirings of a power generator using vertical multi-layered nano power generation elements.

FIG. 3 illustrates wirings of a power generator using vertical multi-layered nano power generation elements.

Referring to FIG. 3, wirings that connect respective position poles in the case of an element with four or more layers are illustrated. By analogy, in a situation where a four-lane expressway is required, only one-lane wiring (+ pole transmission path 5 or − pole transmission path 6) is made, power is transmitted through only one lane (transmission path), and thus the transmission path acts like a resistor and leads to loss of generated power.

In the case in which the transmission path is generated for each layer of individually generated friction elements to transmit power, there is a problem in that performance is lowered due to durability problems and efficiency is reduced when the number of transmission paths is small as illustrated in FIG. 3.

The present disclosure has been proposed to solve the above problems and is directed to providing a frictional electricity generator capable of increasing energy collection efficiency of an energy harvesting element based on a human implant by proposing a structural connection structure of multi-layered nano power generation elements.

According to the present disclosure, there is an effect in that it is possible to reduce the loss of generated power that is caused by the above-described two problems and to transmit electronic energy more rapidly.

Figure 4:
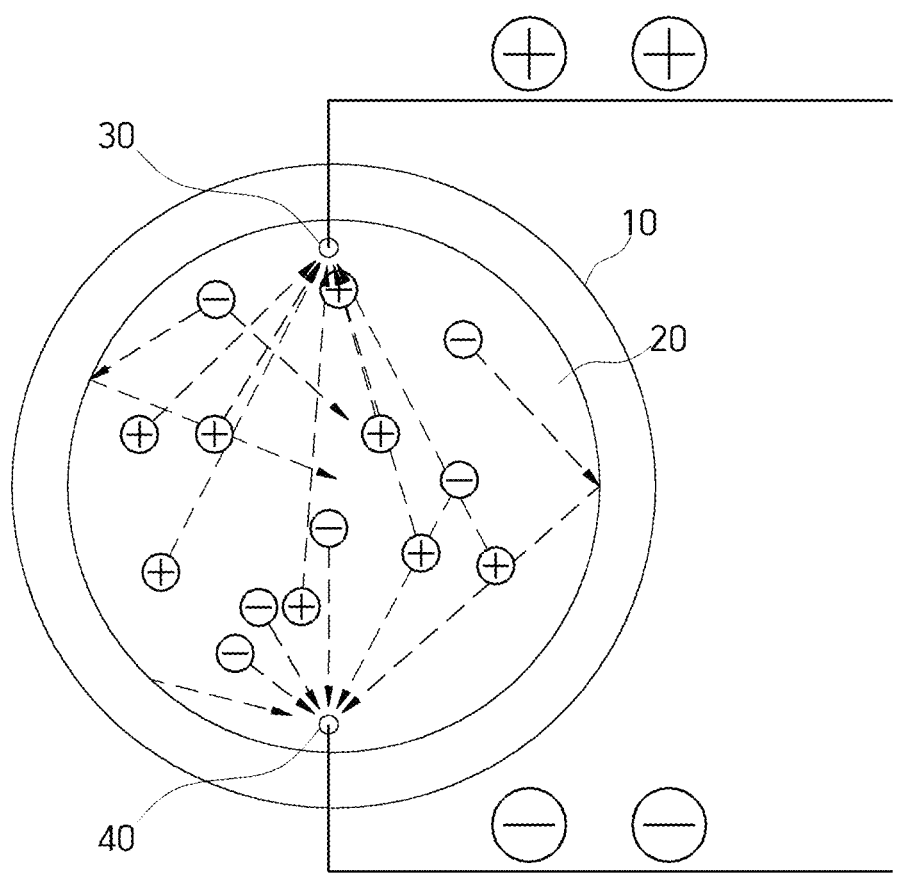
FIGS. 4 and 5 illustrate the arrangement of + poles and − poles of a frictional electricity generator according to an embodiment of the present disclosure.
Figure 5:
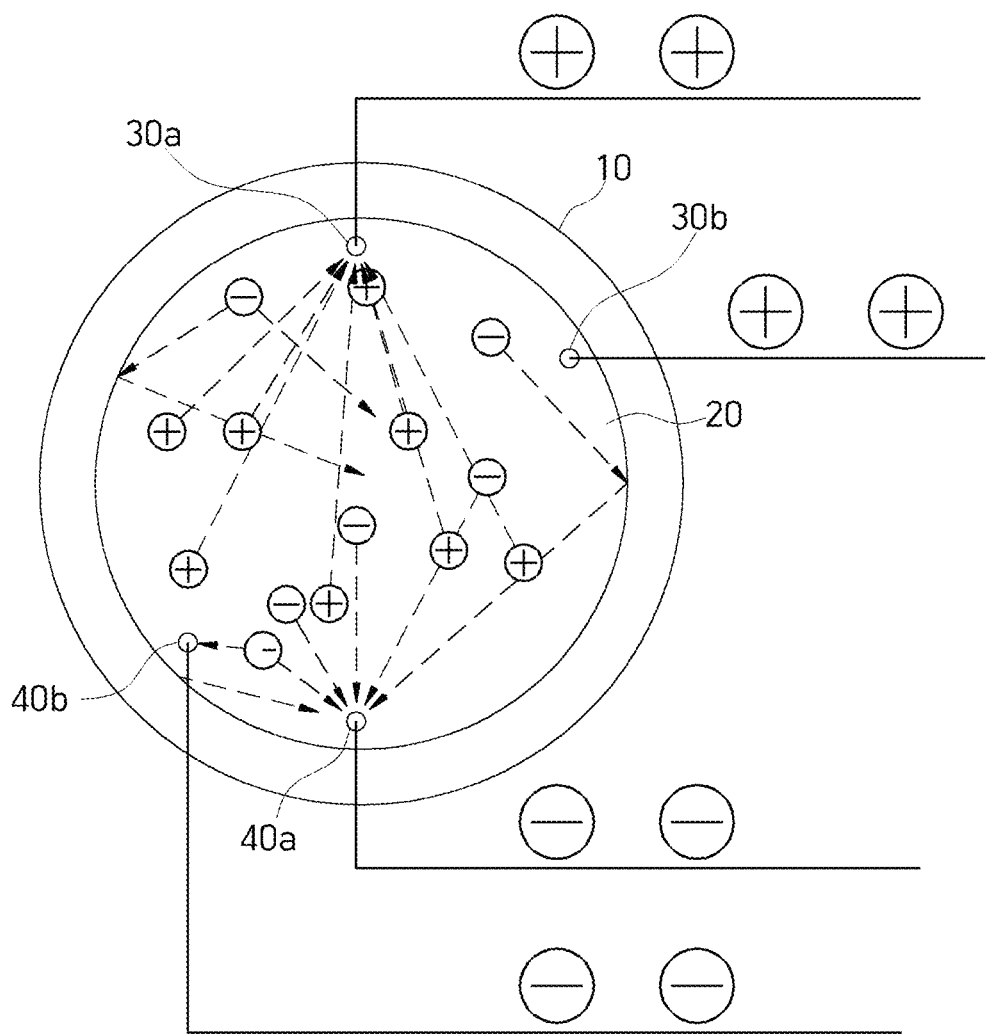

FIGS. 4 and 5 illustrate the arrangement of + poles and − poles of a frictional electricity generator according to an embodiment of the present disclosure.

When a + potential and a − potential are located close to each other in a change in charges, the + potential and the − potential push each other due to a repulsive force, resulting in the loss of generated energy. According to the embodiment of the present disclosure, in order to minimize such a loss, a + position pole 30 and a − position pole 40 for a power generation element 20 in a housing 10 are disposed 180 degrees apart from each other, as illustrated in FIG. 4. In this case, it can be seen that the power generation output is improved by 30% as compared to that in FIG. 2.

FIG. 5 illustrates a case in which a plurality of poles (+ position poles 30a and 30b and − position poles 40a and 40b) are required. According to the embodiment of the present disclosure, in order to prevent the energy loss due to the repulsive force described above, the position poles are disposed at least 90 degrees apart from each other, and thus high power is secured.

Figure 6:
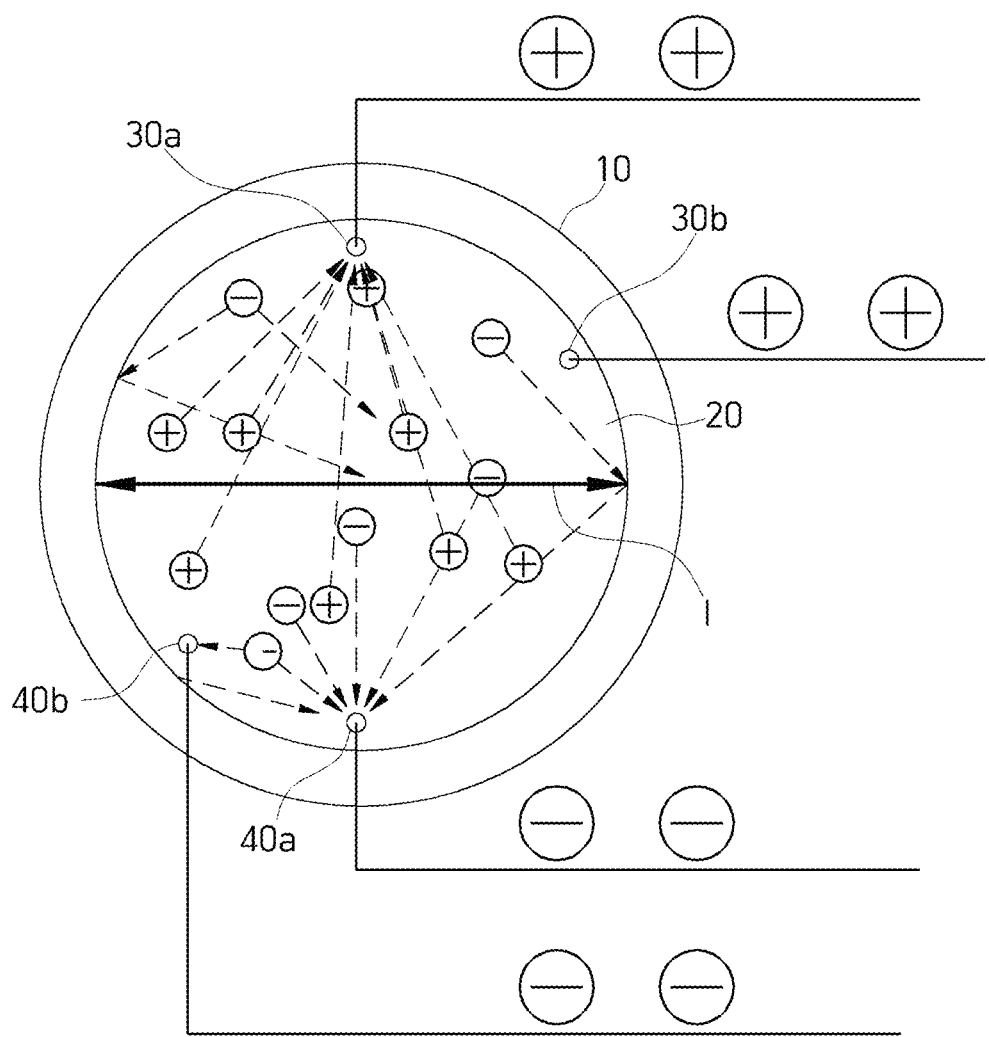
FIG. 6 illustrates the positions of a + pole and a − pole and a diameter of a power generation element of a frictional electricity generator according to an embodiment of the present disclosure.

FIG. 6 illustrates the positions of a + pole and a − pole and a diameter 1 of a power generation element of a frictional electricity generator according to an embodiment of the present disclosure.

As described above with reference to FIG. 5, the case in which there are a plurality of + position poles 30a and 30b and a plurality of − position poles 40a and 40b is illustrated.

As shown in [Equation 1] below, from when a diameter 1 of a power generation element 20 (t) is greater than or equal to a preset length (e.g., 5 cm) and the sum of generated energy e generated by a vertical friction power generation element becomes a preset multiple (e.g., 2 times) or more of an element in one layer, the + position poles and the − position poles are disposed so that the number thereof is increased.

This means that, when a size of the power generation element is increased in a horizontal direction illustrated in FIG. 5 (i.e., when the diameter is greater than or equal to a preset length), the plurality of + position poles and the plurality of − position poles are disposed, $$Te\sum_{i=1}^{n}t_i(e_i) > 2 \times t_1(e_1)(l \geq 50 \text{ mm})$$ [Equation 1]

(Te: total energy of power generation platform, t: power generation element, e: generated energy, and l: diameter of power generation element).

Figure 7:
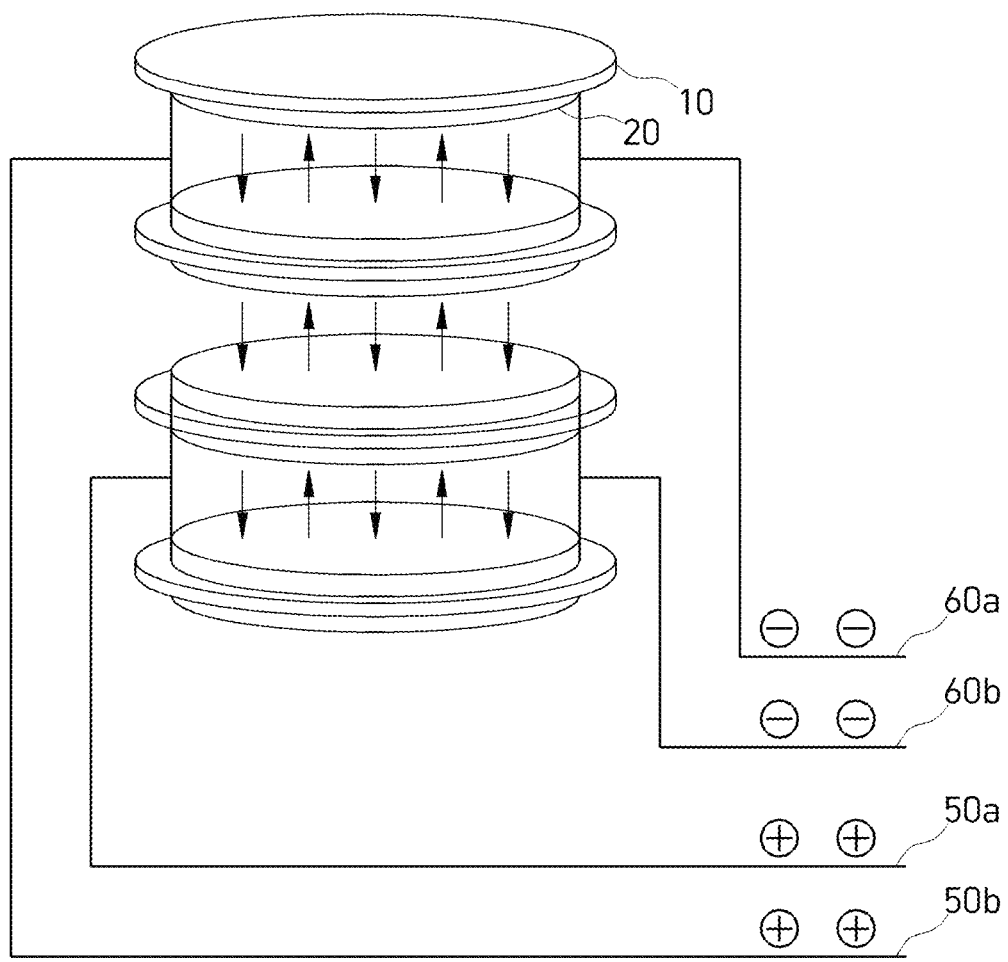
FIG. 7 illustrates connection and wirings between vertical friction elements of a frictional electricity generator according to an embodiment of the present disclosure.

FIG. 7 illustrates connection and wirings between vertical friction elements of a frictional electricity generator according to an embodiment of the present disclosure.

According to the embodiment of the present disclosure, in order to solve the above-described problems (when the transmission path is generated for each layer of the individually generated friction elements and through which the energy is transmitted, performance is lowered due to durability problems, and when the number of transmission paths is small, efficiency is reduced), the number p of transmission paths (+ pole transmission paths 50a and 50b and − pole transmission paths 60a and 60b) is proposed as follows according to [Equation 2] below in addition to the conditions that satisfy [Equation 1] in the description with reference to FIG. 6, and the number of vertical friction elements connected to one transmission path is defined.

The number of transmission paths is applicable only when a diameter of the power generation element vertically disposed is greater than a preset length (e.g., 30 mm).

$$p(l_j) = \frac{n}{2}(n: \text{number of layers of friction element}).$$ [Equation 2]

That is, as illustrated in FIG. 7, when the number of layers of the friction element is 4, the number of layers of the element corresponding to one transmission path becomes 2, and two + pole transmission paths 50a and 50b and two − pole transmission paths 60a and 60b are connected to each other.

When the number of layers of the friction element is 6, three + pole transmission paths and three − pole transmission paths are connected to each other according to [Equation 2].

According to the embodiment of the present disclosure, the positions and number of electrodes for the maximum power generation output transmission of the vertical multilayered nano elements are optimized.

In this case, when a + position pole and a − position pole are provided as a pair, the electrodes are spaced 180 degrees from each other, and when a diameter of the power generation element and the sum of generated energy accordingly satisfy the preset conditions, it is defined that a plurality of + position poles and a plurality of − position poles are provided, and thus power loss that is caused by a mutual repulsive force can be minimized.

Further, in addition to the above-described preset conditions, the number of layers of the friction element connected to one transmission path can be optimized, and thus energy loss that is caused by the transmission paths can be minimized.

While the present disclosure has been particularly described with reference to the embodiments, it will be understood by those skilled in the art that various changes in form and details may be made without departing from the spirit and scope of the present disclosure. Therefore, the disclosed embodiments should be considered in a descriptive sense only and not for purposes of limitation. The scope of the present disclosure is defined not by the detailed description of the present disclosure but by the appended claims, and encompasses all modifications and equivalents that fall within the scope of the appended claims and will be construed as being included in the present disclosure.

What is claimed is:

1. A frictional electricity generator comprising:
a housing; and
a plurality of power generation element layers, each comprising a power generation element which is disposed in the housing and comprises a first pole pair comprising a positive pole and a negative pole disposed according to movement of a positive charge and a negative charge by friction,
wherein, in response to a diameter of the power generation element and the sum of generated energy of the plurality of power generation element layers satisfying preset conditions, each power generation element is configured to include a second pole pair that comprises a positive pole and a negative pole,
wherein the preset conditions are configured to be satisfied in response to the diameter of the power generation element being greater than or equal to a preset length, and the sum of the generated energy of the plurality of power generation element layers being greater than or equal to a preset times the generated energy by a single-layer power generation element, and
wherein the positive pole and the negative pole of the same pole pair are disposed 180 degrees apart from each other.

2. The frictional electricity generator of claim 1, wherein the preset conditions are as follows according to [Equation 1], $$Te\sum_{i=1}^{n} t_i(e_i) > 2 \times t_1(e_1)(l \geq 50 \text{ mm}) \quad \text{[Equation 1]}$$

(Te: sum of the generated energy of the plurality of power generation element layers, t: energy generated by each power generation element, and l: a diameter of a power generation element), wherein the diameter of the power generation element is greater than or equal to 50 mm, and the sum of the generated energy of the plurality of power generation element layers is greater than two times the generated energy by the single-layer power generation element.

3. The frictional electricity generator of claim 1, wherein the positive pole of the first pole pair and the negative pole of the second pole pair are spaced 90 degrees or more from each other.

4. The frictional electricity generator of claim 1, further comprising multiple transmission lines connected to the positive poles and the negative poles of the plurality of power generation element layers, and wherein, in response to a diameter of the power generation element being greater than or equal to a preset value, a number of the plurality of power generation element layers that are connected to one of the multiple transmission lines is configured to be determined based on a total number of the plurality of power generation element layers.

5. The frictional electricity generator of claim 4, wherein the number of the plurality of power generation element layers that are connected to the one of the multiple transmission lines is determined according to [Equation 2], $$p(l_j) = \frac{n}{2} \quad \text{[Equation 2]}$$

(p: a number of the plurality of power generation element layers connected to one transmission line, l: a diameter of a power generation element, and n: a total number of the plurality of power generation element layers).

6. The frictional electricity generator of claim 4, wherein the plurality of power generation element layers comprise a first power generation element and a second power generation element opposing the first power generation element, wherein the positive pole of the first power generation element and the positive pole of the second power generation element are connected to a first one of the multiple transmission lines, and wherein the negative pole of the first power generation element and the negative pole of the second power generation element are connected a second one of the multiple transmission lines.

\* \* \* \* \*